United States Patent [19]
Lin

[11] Patent Number: 6,105,512
[45] Date of Patent: Aug. 22, 2000

[54] CARGO HOLDING BOARD WITH DIMOUNTABLE SUPPORTING LEGS

[75] Inventor: Tsun Jen Lin, Taipei, Taiwan

[73] Assignee: Su Yin Tsui, Parsippany, N.J.

[21] Appl. No.: 09/301,689

[22] Filed: Apr. 29, 1999

[51] Int. Cl.[7] .................................................. B65D 19/12
[52] U.S. Cl. ...................... 108/56.3; 108/57.14; 108/55.5
[58] Field of Search .................. 108/56.3, 56.1, 108/57.14, 57.17, 57.19, 57.2, 55.1, 55.5, 51.11

[56] References Cited

U.S. PATENT DOCUMENTS

| | | | |
|---|---|---|---|
| 2,487,687 | 11/1949 | Arthur et al. | 108/57.14 |
| 2,674,936 | 4/1954 | Ridge | 108/56.3 X |
| 2,721,756 | 10/1955 | Markussen | 108/57.17 X |
| 2,916,240 | 12/1959 | Romero | 108/57.14 |
| 5,337,681 | 8/1994 | Schrage | 108/56.1 |
| 5,445,084 | 8/1995 | Durand | 108/56.3 |
| 5,802,986 | 9/1998 | Lin | 108/57.14 |

FOREIGN PATENT DOCUMENTS

| | | | |
|---|---|---|---|
| 533876 | 11/1956 | Canada | 108/57.14 |
| 320146 | 4/1986 | China . | |
| 1567452 | 5/1990 | U.S.S.R. | 108/55.1 |

*Primary Examiner*—Peter M. Cuomo
*Assistant Examiner*—Hanh V. Tran
*Attorney, Agent, or Firm*—Shoemaker and Mattare

[57] ABSTRACT

A cargo holding board with dismountable supporting legs is provided, which can be used in cargo transportation to hold cargo thereon during transportation. This cargo holding board includes a grid-like frame; a plurality of supporting legs for supporting the grid-like frame, each supporting leg being fittable to a segment of the grid-like frame; and a strap securing mechanism for securing to the supporting leg a strap for strapping the cargo tightly in position on the grid-like frame. The grid-like frame includes a plurality of parallel lengthwise and crosswise bars mounted in an interleaved manner on a rectangular frame bar. With the strap securing mechanism, the strap can be fastened tightly to secure the cargo tightly in position on the grid-like frame. The lengthwise bars and crosswise bars forming the cargo holding board can be made of steel, and the supporting legs can be made of plastics. This allows the cargo holding board to be easy to recycle and requires no fumigation at the entry port. Moreover, the supporting legs and the enforcement beams linked thereto would prevent crushing to the underlying floor or cargo.

2 Claims, 10 Drawing Sheets

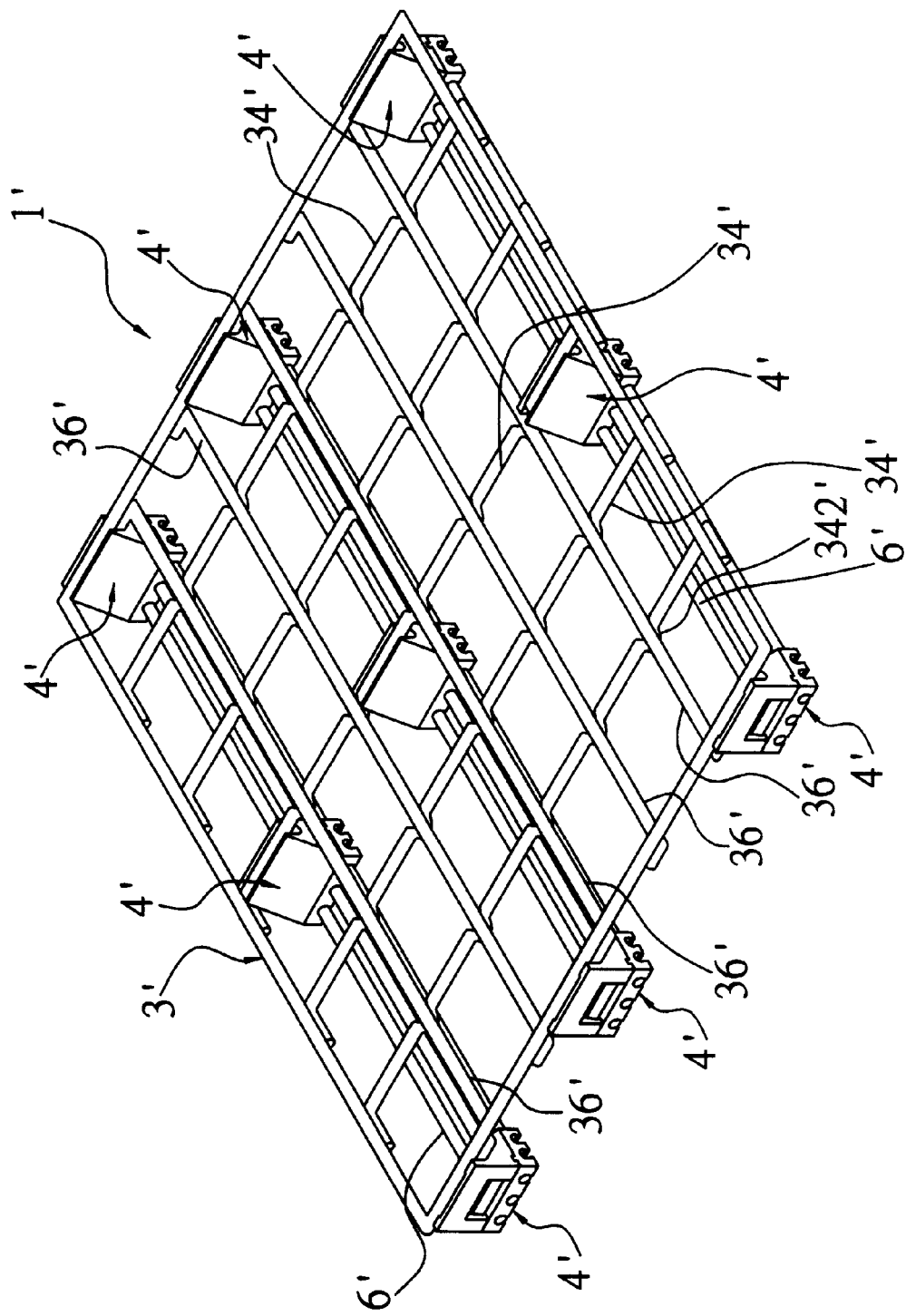

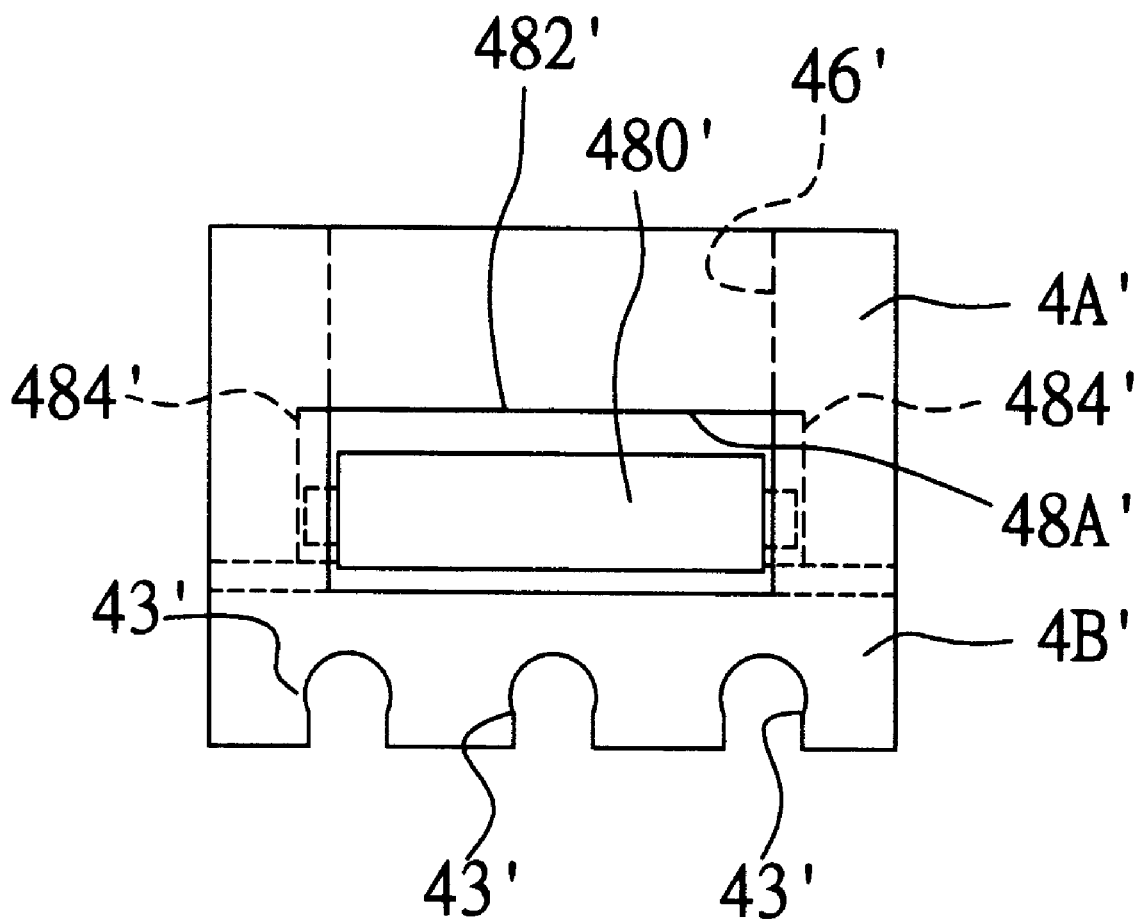

CARGO HOLDING BOARD WITH DIMOUNTABLE SUPPORTING LEGS

1. FIELD OF THE INVENTION

This invention relates to a cargo holding board, and more particularly, to a cargo holding board with dismountable supporting legs, which can be used in cargo transportation to hold a piece of cargo thereon during transposition.

2. DESCRIPTION OF RELATED ART

A cargo holding board is used in cargo transportation to hold a cargo box so as to allow the cargo box to be easily handled during the transportation. Conventional cargo holding boards are made of wood, plastics, metal and so on. However, since cargo holding boards are usually discarded or recycled after the cargo reaches destination, they are typically made of wood so as to save manufacture cost while nevertheless allowing rigid support to the cargo. FIG. 1 and FIG. 2 are two examples of cargo holding boards that are made of wood; wherein FIG. 1 shows one that is provided with no horizontal wooden bars at the bottom; and whereas FIG. 2 shows one that is provided with a horizontal frame of parallel wooden bars at the bottom, which can help strengthen the entire of the cargo holding board and also help allow uniform distribution of the cargo's weight over the board. Moreover, these bottom bars can help prevent the bottom of the board from crushing the underlying cargo, if any. However, since a number of countries require all wood-made things to undergo a fumigation process at the entry port for quarantine purpose, the use of wood-made cargo holding boards would increase cost to the exporter.

The Applicant of this application has disclosed a combination-type of cargo holding board in ROC New Utility Model No. 320146, which features easy dismountable supporting means that allows the cargo holding board to be highly adaptable to any utilization conditions. This patented cargo holding board is not wood-made, so that the abovementioned fumigation is not required at the entry port of the imported country. It is therefore more cost-effective to manufacture and utilize such a cargo holding board. One drawback to this patented cargo holding board, however, is that its support legs would easily crush the underlying cargo, if any.

Further, the securing of the cargo box on the cargo holding board is conventionally carried out through the use of a plastic sheet or a strap such as a PE strap or a steel-sheet strap. The use of strap, however, would require the additional use of clasping or welding means to tie the two ends of the strap together, which is quite inconvenient and costly to implement.

SUMMARY OF THE INVENTION

It is therefore an objective of this invention to provide a cargo holding board for cargo transportation, which allows the cargo held thereon to be easily and conveniently secured in position by means of a strap.

It is another objective of this invention to provide a cargo holding board for cargo transportation, which, when overlying another cargo box, would not cause crushing to the underlying cargo box.

In accordance with the foregoing and other objectives of this invention, an improved cargo holding board for cargo transportation is provided. The cargo holding board of the invention includes: (a) a grid-like frame for supporting cargo boxes thereon; (b) a plurality of supporting legs for supporting the grid-like frame, each supporting leg having an elongated slot fittable to a segment of the grid-like frame; and (c) a strap securing mechanism for securing to the supporting leg a strap for strapping the cargo in position on the grid-like frame.

The strap securing mechanism is formed with a void portion, an opening connected with the void portion and a locking piece received within the opening; wherein the strap is wound through the void portion in one supporting leg to the opening thereof then around the locking piece, and finally out from the void portion, so as to allow the locking piece to be fitted tightly to a spacing between the void portion and the opening to allow the strap to be tightly secured to the supporting leg to fasten the cargo on the grid-like frame. The grid-like frame includes a rectangular bar and a plurality of parallel lengthwise and crosswise bars mounted in an interleaved manner on the rectangular bar.

Each of the lengthwise bars is formed with a plurality of crooked portions at the intersections with the crosswise bars; and each of the crosswise bars is formed with a plurality of crooked portions at the intersections with the lengthwise bars. The two ends of each of the lengthwise and crosswise bars are angled, and the angled ends are fittable into the recessed portion of the elongated slot in each supporting leg. The angled ends of each of the lengthwise and crosswise bars is welded to the rectangular bar. The lengthwise and crosswise bars are made of steel.

With the strap securing mechanism, when a cargo box is mounted on the grid-like frame, the strap can be wound first through the void portion in one supporting leg to the opening thereof, then around the locking piece, and finally out from the void portion. By pulling forcibly on the free end of the strap, the locking piece can be fitted tightly to the spacing between the void portion and the opening, whereby the strap can be fastened tightly to the supporting leg to secure the cargo box tightly in position on the grid-like frame. The more forcibly the strap is pulled, the locking piece will be more tightly fitted and thus help fasten the strap more tightly, thereby securing the cargo box more tightly in position.

Alternatively, in accordance with another embodiment of the invention, the strap securing mechanism further includes the forming of a pair of guiding grooves on the side walls of the opening in the supporting legs for a pair of protruding portions integrally formed on both ends of the locking piece, thereby allowing the locking piece to slide upwardly and downwardly along the guiding grooves. Therefore, by pulling up a strap which passes through the void portion, and then winds around the locking piece and finally passes through the void portion, the locking piece can be pulled up along the guiding grooves to fit tightly to the spacing between the void portion and the opening, thereby fastening the cargo box tightly in position.

The various constituent parts of the cargo holding board of the invention are not limited to particular shapes; and can be suitable shapes such as cubic or conic. Moreover, the supporting leg can be either integrally formed, or separated into two blocks which are then combined by means of gluing, welding, or various other bonding means For example, the blocks can be formed from metal through molding/cutting or plastic injection molding with suitable enforcement that allows the cargo holding board to support heavy cargo thereon. The forming of two separate blocks can help simply the procedural complexity in the machining of the cargo holding board.

BRIEF DESCRIPTION OF DRAWINGS

The invention can be more fully understood by reading the following detailed description of the preferred embodiments, with reference made to the accompanying drawings, wherein:

FIG. 10 shows a second preferred embodiment of the cargo holding board according to the invention;

FIG. 13 shows a side view of the supporting leg of FIG. 11;

DETAILED DESCRIPTION OF PREFERRED EMBODIMENTS

First Preferred Embodiment

Figure 1:
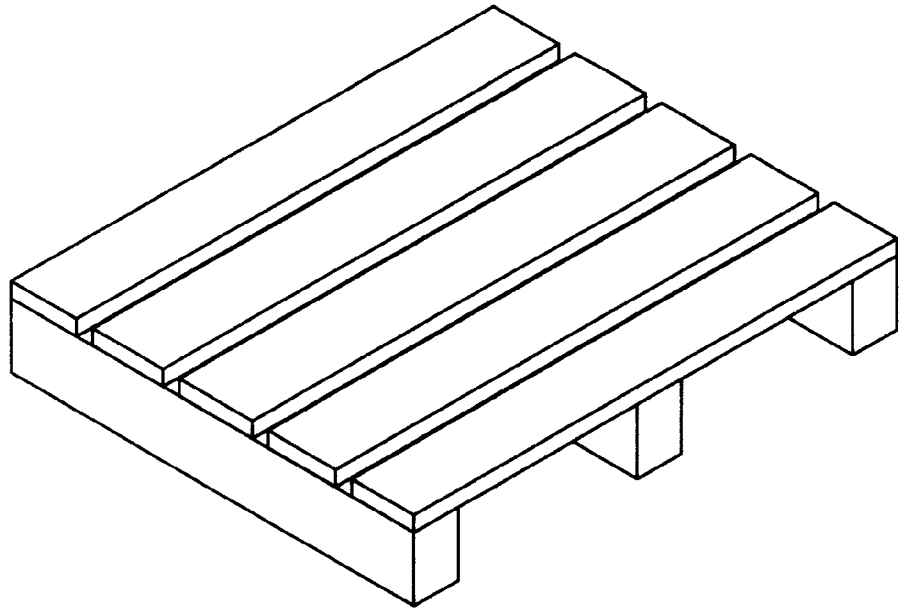
FIG. 1 (PRIOR ART) is a perspective view of a conventional cargo holding board which made of wood and whose bottom is provided with no horizontal wooden bars.
Figure 2:
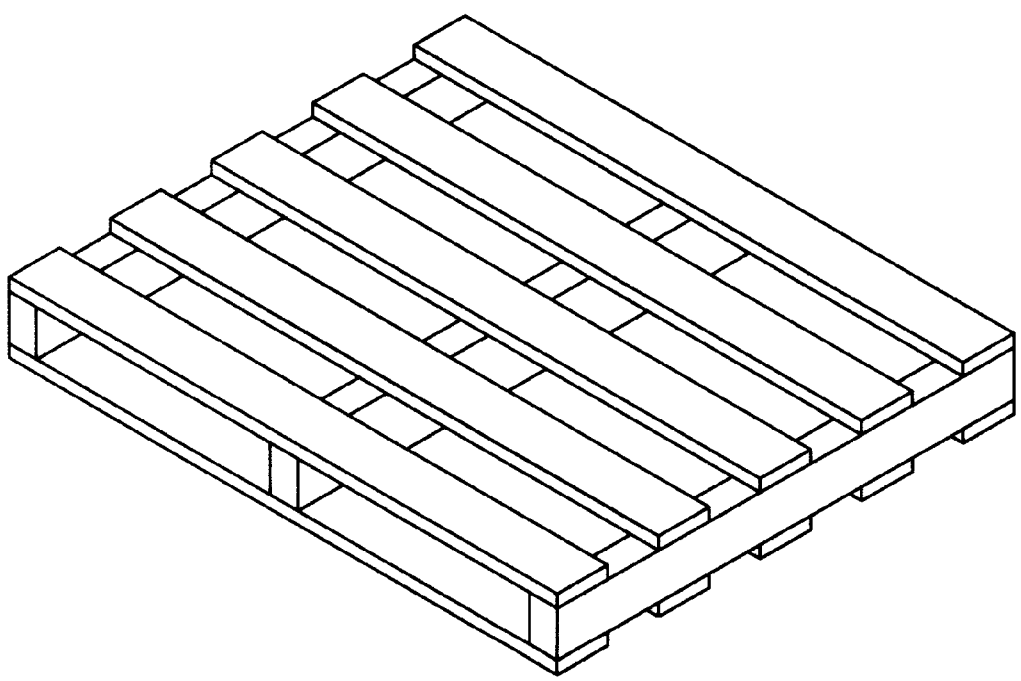
FIG. 2 (PRIOR ART) is a perspective view of a conventional cargo holding board which is made of wood and whose bottom is provided with a horizontal frame of parallel wooden bars.
Figure 3:
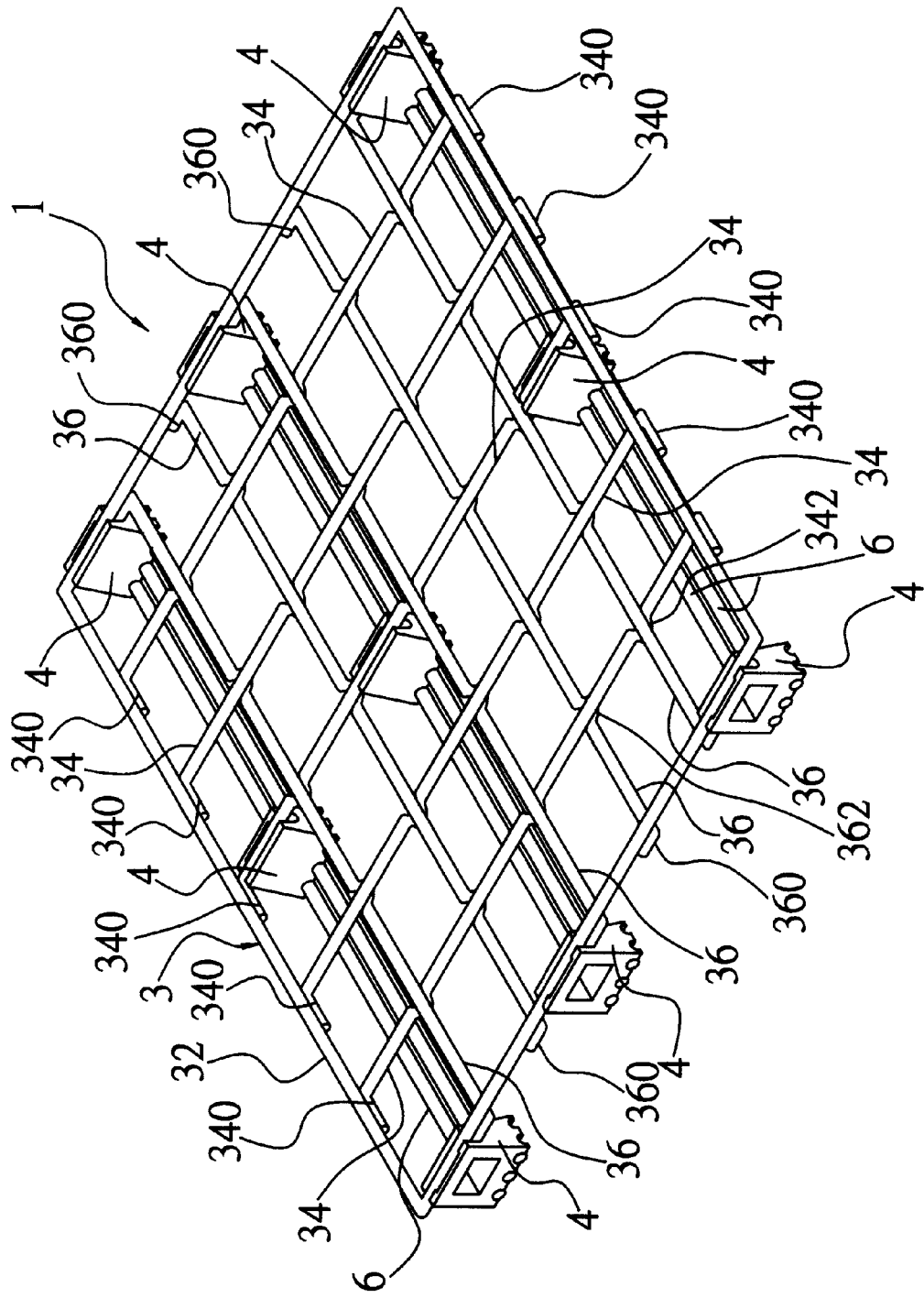
FIG. 3 is a perspective view of a first preferred embodiment of the cargo holding board according to the invention.

FIG. 3 is a perspective view of a first preferred embodiment of the cargo holding board according to the invention. As shown, the cargo holding board 1 of this embodiment includes a grid-like frame 3 and a plurality of supporting legs 4 used to support the grid-like frame 3 at an elevated height from the ground or the underlying cargo box if any. The grid-like frame 3 is used to support a cargo box (not shown) thereon, and is composed of a rectangular bar 32 on which a plurality of parallel and substantially equally-spaced lengthwise bars 34 and crosswise bars 36 are mounted in an interleaved manner. The two ends 340 of each of the lengthwise bars 34 are angled, and the angled part is welded or tied to the rectangular bar 32, and similarly, the two ends 360 of each of the crosswise bars 36 are angled, and the angled part is attached to the rectangular bar 32 by welding or other conventional ways. Moreover, each of the lengthwise bars 34 is formed with a plurality of crooked portions 342, and each of the crosswise bars 36 is formed with a plurality of crooked portions 362, so that the lengthwise bars 34 can be flatly interleaved with the crosswise bars 36 to provide a flat supporting plane to the cargo box (not shown) mounted on the grid-like frame 3.

The supporting legs 4 are preferably arranged in an array on the bottom side of the grid-like frame 3, so as to balance the weight of the cargo box mounted on the grid-like frame 3. In order to prevent these supporting legs 4 from crushing the underlying cargo, a plurality of beams 6 are arranged between neighboring supporting legs 4 and linked to the bottom side of these supporting legs 4. In the case of FIG. 3, for example, two beams 6 are arranged crosswise between each neighboring pair of the supporting legs 4.

Figure 4:
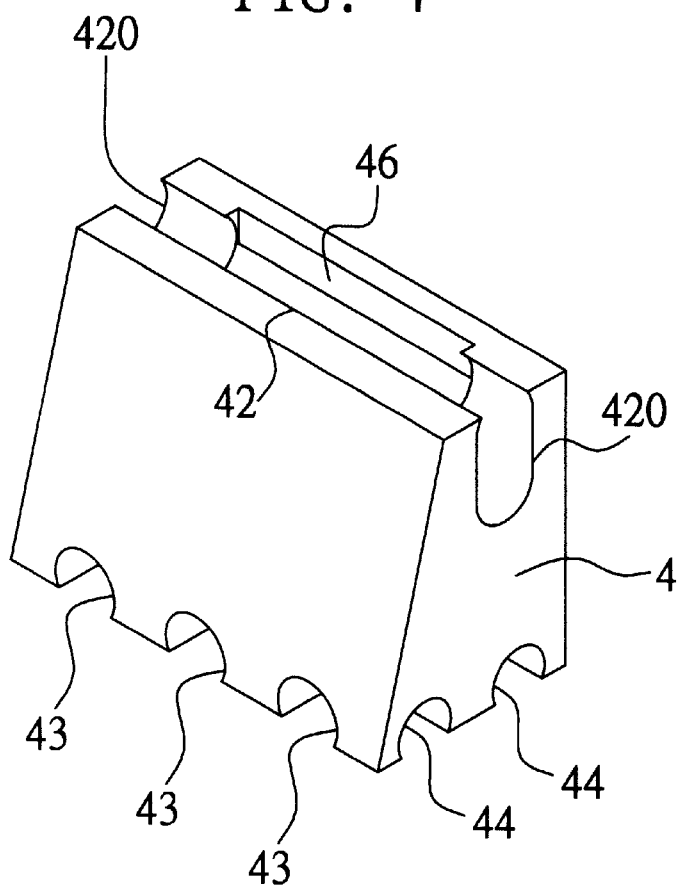
FIG. 4 is a perspective view of each of the supporting legs utilized in the cargo holding board of FIG. 3.
Figure 5:
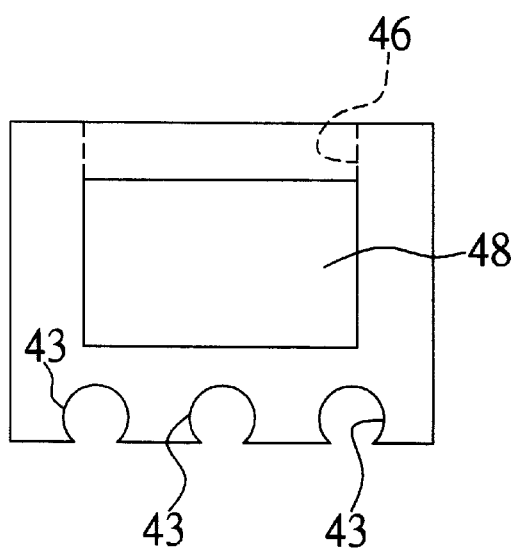
FIG. 5 is a side view of the supporting leg of FIG. 4.
Figure 6:
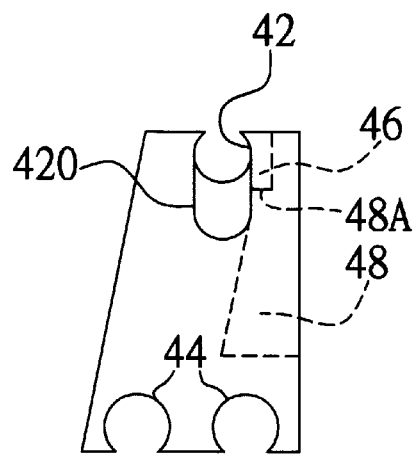
FIG. 6 is another side view of the supporting leg of FIG. 4.

Referring to FIG. 4 through FIG. 6, each support leg 4 is a solid body substantially having a trapezoidal cross section and formed with a lengthwise elongated slot 42 on the top, a plurality of crosswise slots 43 on the bottom, and a plurality of lengthwise slots 44 on the bottom. (here, the terms "crosswise" and "lengthwise" are used in reference to the lengthwise bars 34 and the crosswise bars 36 shown in FIG. 3). The elongated slot 42 further includes a recessed portion 420. The elongated slot 42 can be fitted to one of the lengthwise bars 34 or one of the crosswise bars 36 so that the supporting leg 4 can be used to support the grid-like frame 3, while the recessed portion 420 can be fitted to one angled end 340 of the lengthwise bars 34 or one angled end 360 of the crosswise bars 36. Further, the supporting leg 4 is formed with an opening 48 and a vertically-extending void portion 46 connecting with the opening 48. A spacing 48A is thus formed in the connection between the void portion 46 and opening 48.

Figure 7:
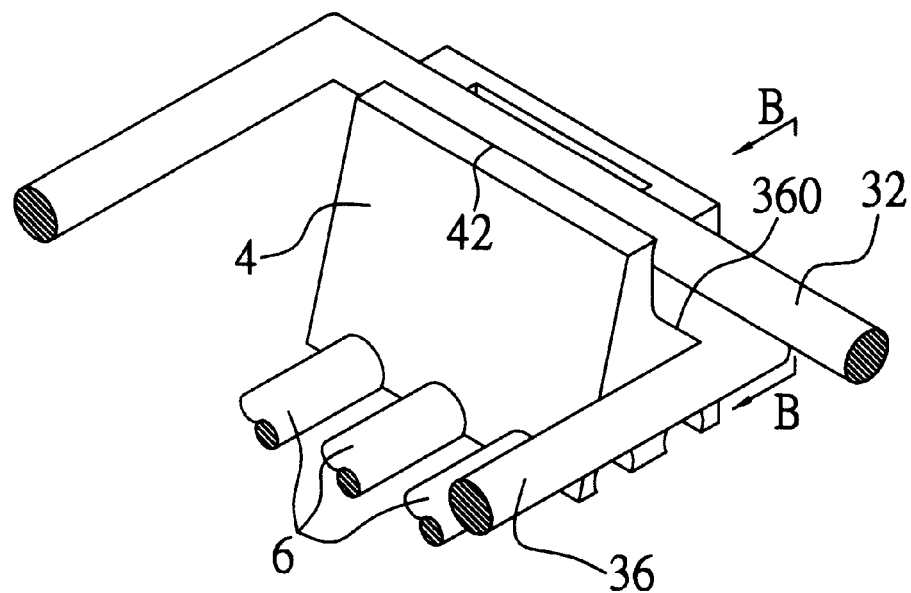
FIG. 7 is a perspective view showing how each supporting leg is used to support the grid-like frame of the cargo holding board.
Figure 8:
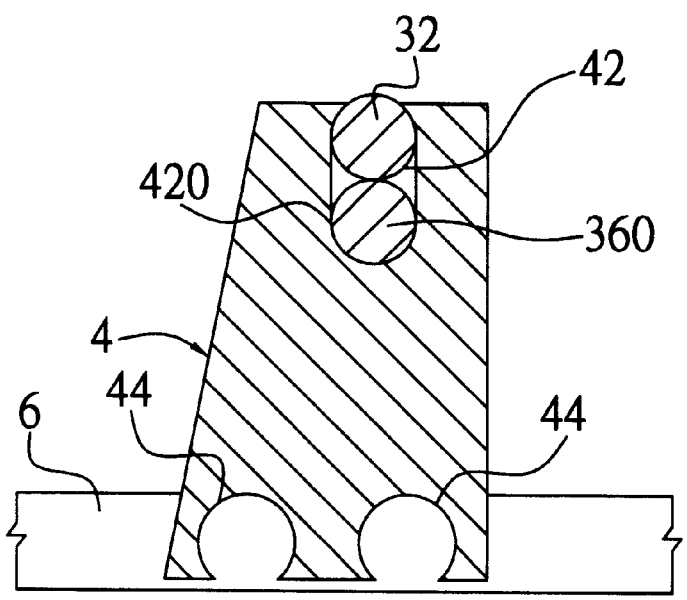
FIG. 8 is a sectional view cutting through the line B—B shown in FIG. 7.

FIG. 7 is a perspective view showing how each supporting leg 4 is used to support the rectangular bar 32 of the grid-like fire 3 of the cargo supporting board 1; while FIG. 8 is a sectional view cutting through the line B—B shown in FIG. 7. As shown, the angled part 360 of one of the crosswise bars 36 is fitted into the recessed portion 420 of the elongated slot 42 in the supporting leg 4, whereby the supporting leg 4 can be prevented from rotating about the part of the rectangular bar 32 where the elongated slot 42 is fitted.

Figure 9A:
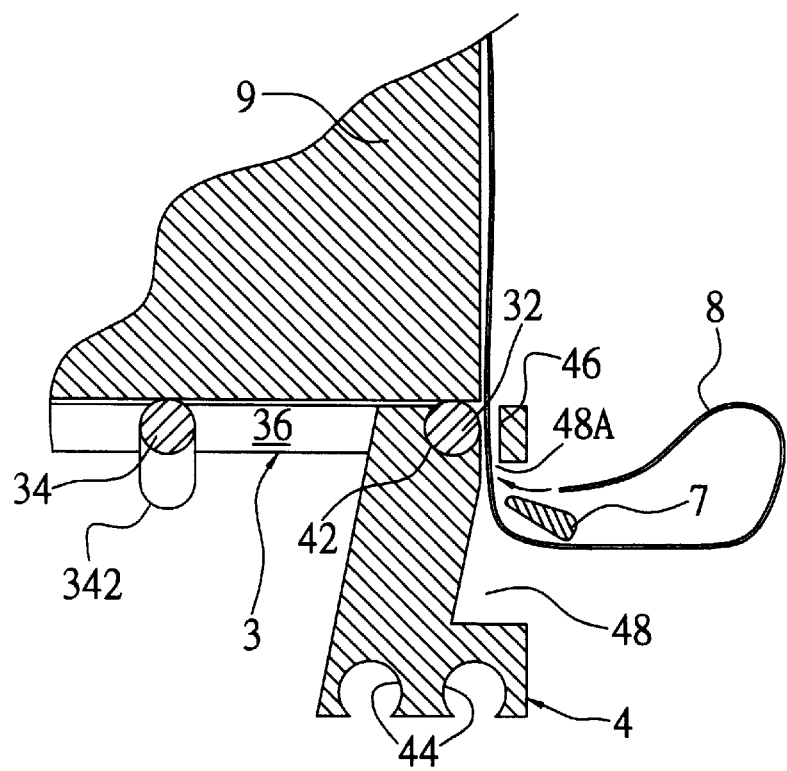
FIG. 9A is sectional view showing how a cargo box mounted on the cargo holding board of FIG. 3 can be secured in position by means of a strap securing mechanism.
Figure 9B:
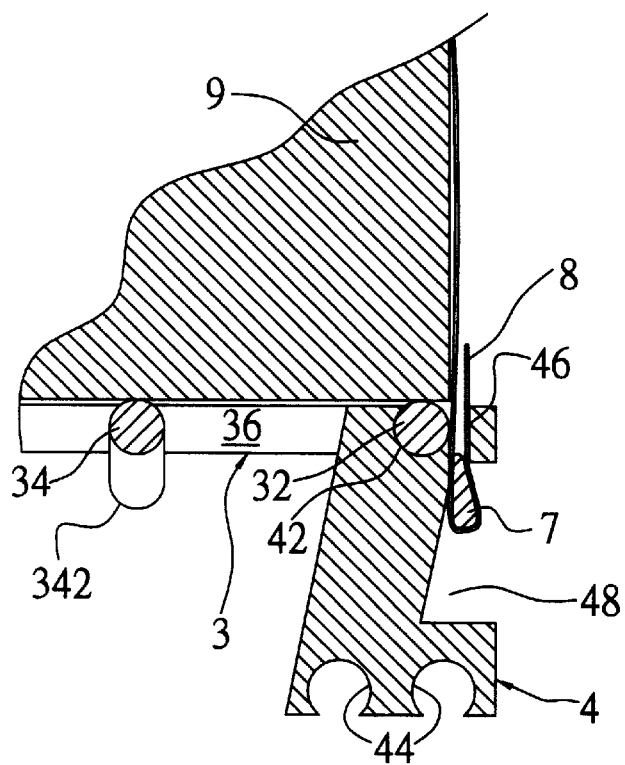
FIG. 9B shows the same of FIG. 9A except when the strap is fastened in position.
Figure 11:
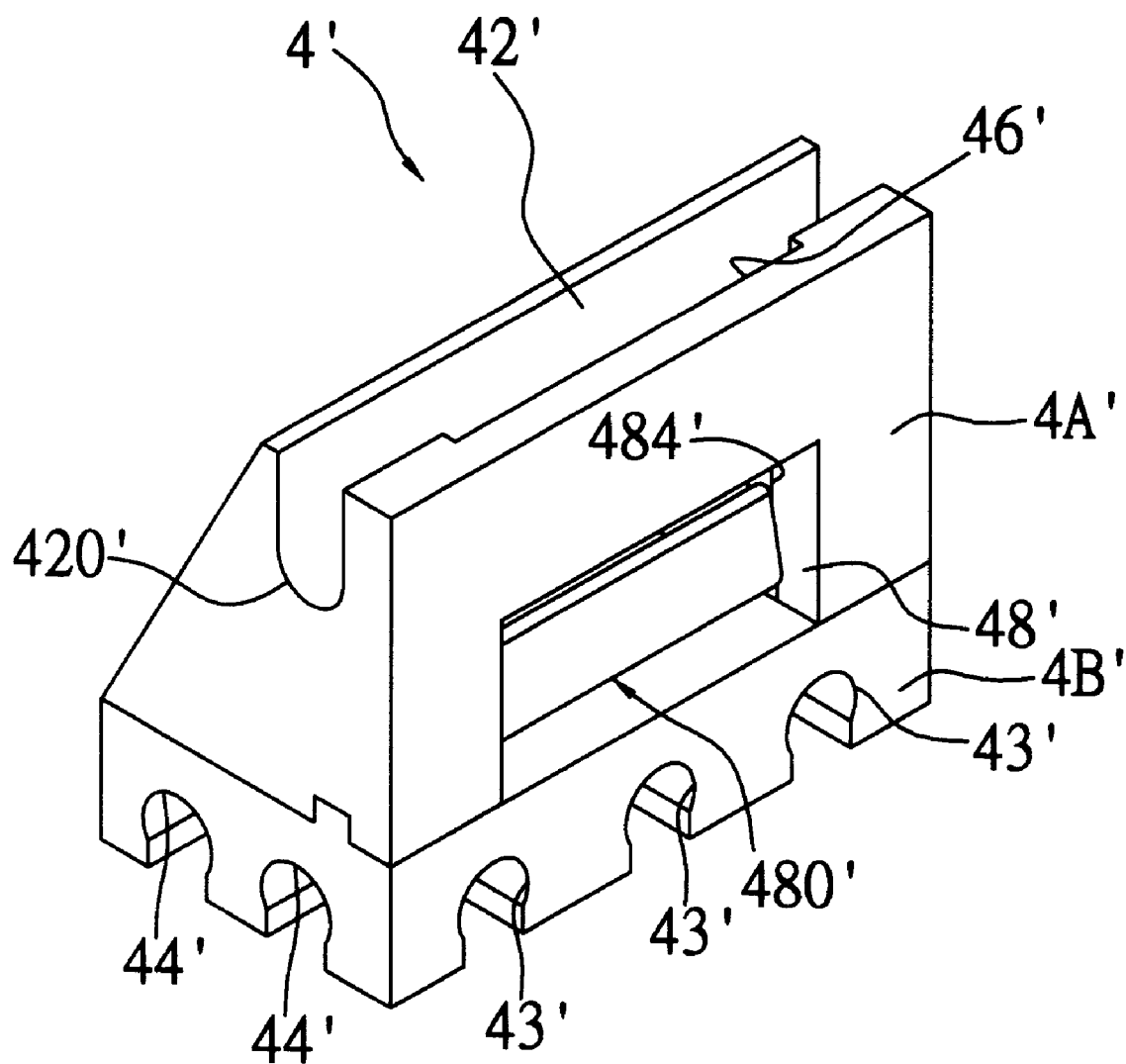
FIG. 11 shows a perspective view of the supporting leg utilized in the cargo holding board of FIG. 10.
Figure 12:
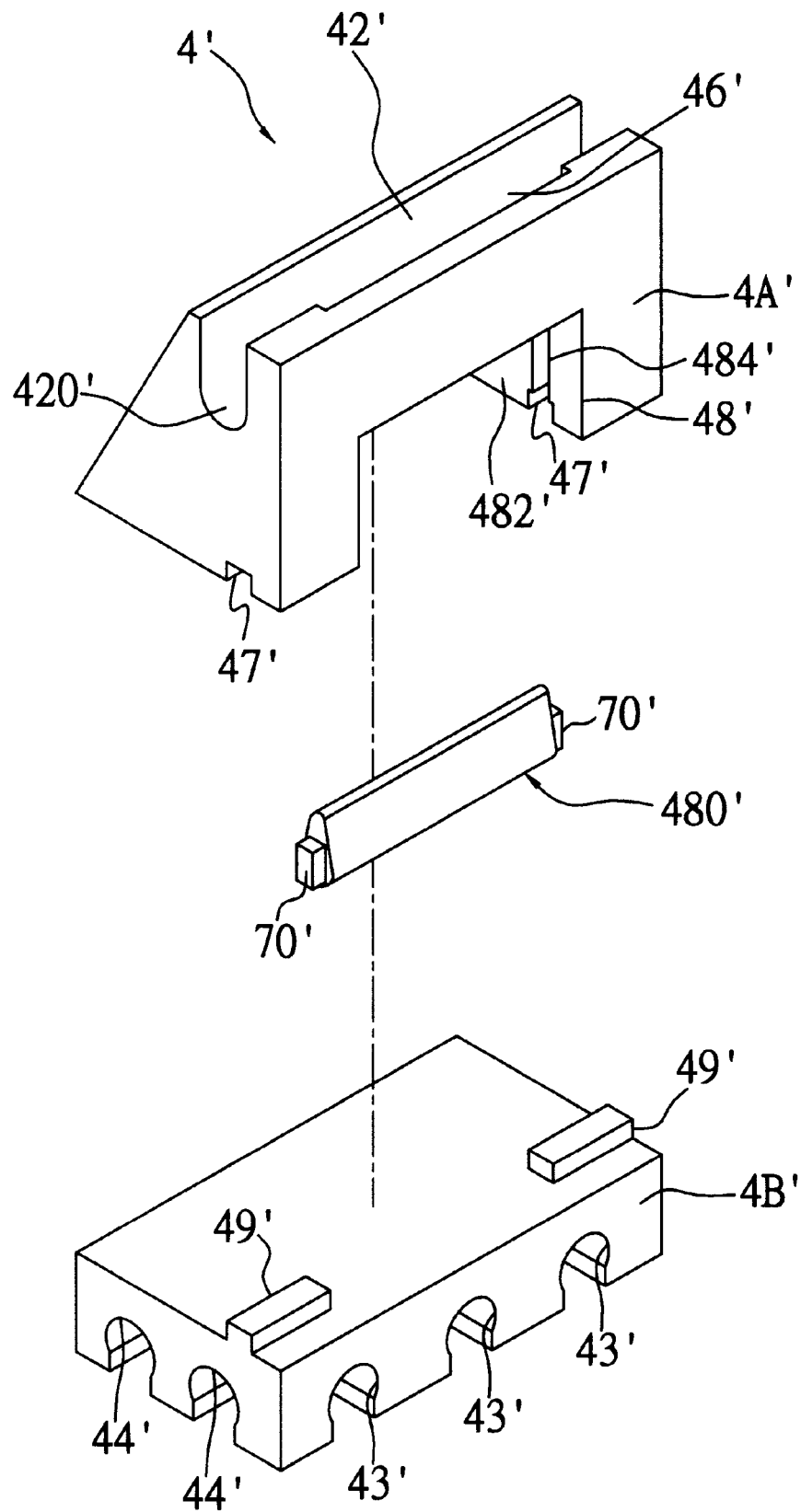
FIG. 12 shows an exploded view of the supporting leg of FIG. 11.

Referring to FIG. 9A, the opening 48 is used to receive a locking piece 7 therein. When a cargo box 9 is mounted on the grid-like frame 3, a strap 8 can be wound first through the void portion 46 to the opening 48 in the supporting legs 4, then around the locking piece 7, and finally out from the void portion 46. By pulling forcibly on the free end of the strap 8, the locking piece 7 can be fitted tightly to the spacing 48A between the void portion 46 and the opening 48, as illustrated in FIG. 9B, whereby the strap 8 can be secured tightly to the supporting leg 4 to secure the cargo box 9 tightly in position on. the grid-like frame 3. The more forcibly the strap 8 is pulled, the locking piece 7 will be more tightly fitted and thus help fasten the strap 8 more tightly, thereby sect the cargo box 9 more tightly in position.

Second Preferred Embodiment

Figure 14A:
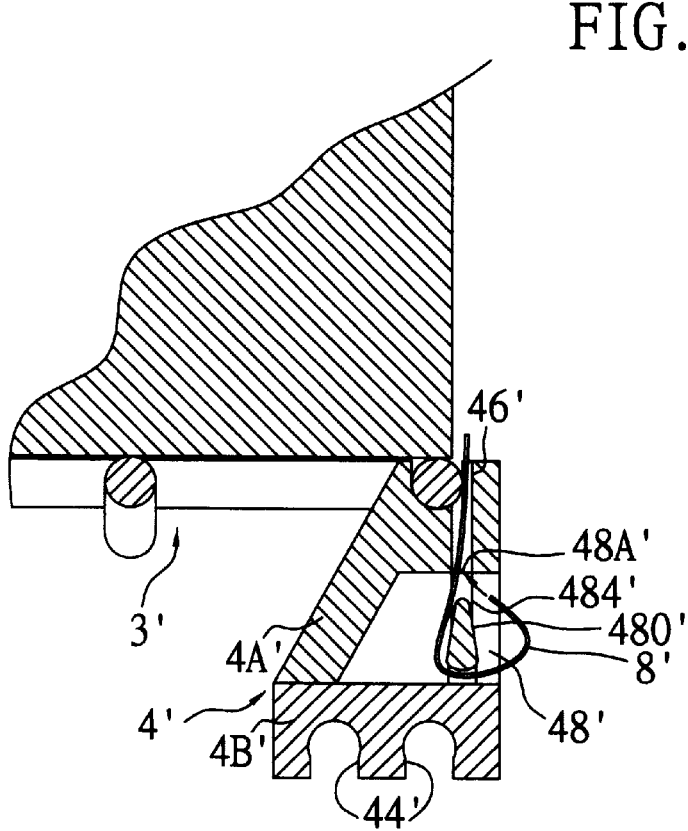
FIG. 14A is a sectional view showing how a cargo box mounted on the cargo holding board of FIG. 10 can be secured in position by means of a strap securing mechanism.
Figure 14B:
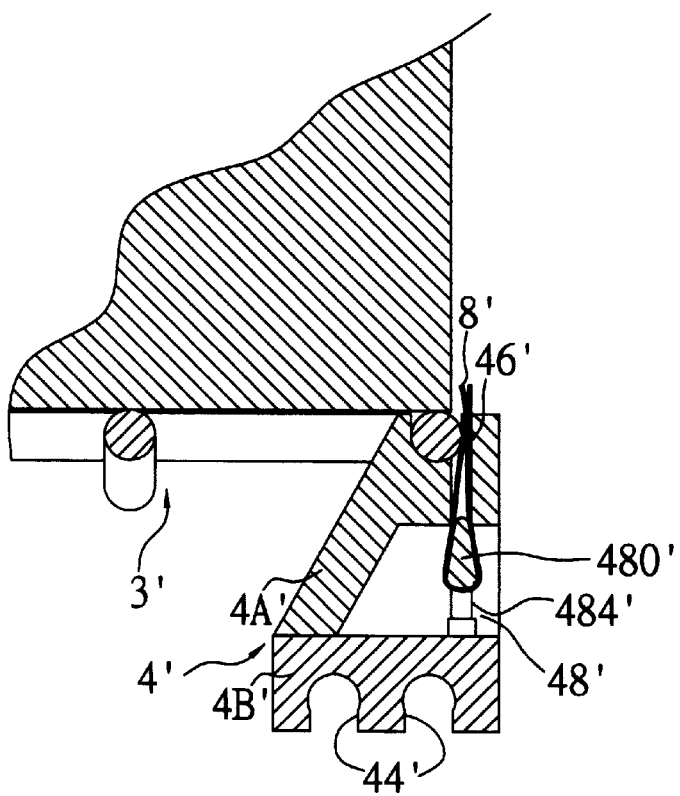
FIG. 14B shows the same of FIG. 11A except when the strap is fastened in position.

A second preferred embodiment of the cargo holding board according to the invention is disclosed in the following with reference to FIGS. 10 to FIGS. 14A–14B. As shown in FIG. 10, in this embodiment, the supporting leg 4' differs from that used by the previous embodiment shown. in FIG. 6 particularly in that the supporting leg 4' composed of an upper body 4A' and a lower body 4B'. The upper body 4A' is also formed with a lengthwise elongated slot 42' on the top, a recessed portion 420' connected to the elongated slot 42', a vertically extending void portion 46' connected to the elongated slot 42', an opening 48' connecting the void portion 46' and a spacing 48A' formed in the connection between the void opening 46' and opening 48'. Further, the side walls 482' of the opening 48' are each formed with a guiding groove 484' for engaging with a protruding portion 70' horizontally protruded form the end of the locking piece 480', so as to allow the locking piece 480' to slide upwardly and downwardly along the guiding groove 484' by means of the protruding portion 70'. Therefore, as shown in FIG. 14A, when pulling up a strap 8' that passes through the void portion 46' to the opening 48' in the upper body 4A', and then winds around the locking piece 480', and finally passes out from the void portion 46', the locking piece 480' is pulled up along the guiding groove 484' to fit tightly into the spacing 48A' between the void portion 46' and the opening 48' as shown in FIG. 14B, thereby securing the strap 8' to the upper body 4A' of the supporting leg 4 to allow the cargo box mounted on the grid-like fame 3' to be secured in position The lower body 4B' has a plurality of crosswise slots 43' and lengthwise slots 44' on the bottom for the beams 6' to fit therein. On the top of the lower body 4B' a pair of engaging protrusions 49' are formed to engage with a pair of engaging slots 47' such that the lower body 4B' can be securely attached to the upper body 4A' to form the supporting 4'.

The grid-like frame 3' also differs from that used by the previous embodiment shown in FIG. 3. The grid-like frame 3' in this embodiment as shown in FIG. 10 has a plurality of crosswise bars 36' having no crooked portions and a plurality of lengthwise bars 34' having crooked portions 342'. By the arrangement, the manufacturing cost and assembly of the grid-like frame 3' is lower and easier than those of the grid-like frame 3 illustrated in the previous embodiment.

In conclusion, the cargo holding board of the invention has the following advantages over the prior art.

First, the cargo holding board of the invention allows the strap 8 to be secured in position by means of the locking piece 7 and the void portion 46 and opening 48 in each supporting leg 4, without having to use clasping means or welding means as in the case of the prior art, so that the invention allows the mounting of the cargo on the cargo holding board to be easier and more convenient to carry out than the prior art Second, the crosswise slots 43 and lengthwise slots 44 in the supporting legs 4 allow enforcement beams to be fitted therein, thereby allowing the cargo holding board 1 of the invention to be more rigidly enforced to support the cargo mounted thereon, and also allowing the cargo holding board 1 of the invention not to crush the underlying cargo, if any.

Third, the supporting legs 4 can be easily dismountable from and remountable to the grid-like frame 3, so that the number and position thereof can be varied with the weight and size of the cargo mounted on the cargo holding board 1. Moreover, the supporting legs 4 allows a plurality of enforcement beams 6 to be linked thereto so as to fiber enforce the support to the grid-like frame 3 without having to increase the number of supporting legs 4. This helps reduce the cost of using the cargo holding board.

Fourth, the particular manner of interleaving the lengthwise bars 34 and the crosswise bars 36 on the grid-like frame 3 allows the grid-like frame 3 to be more forcefully enforced to provide an increased weight bearing capability to the cargo mounted thereon. The forming of the crooked portions 342, 362 allows the interleaved lengthwise bars 34 and crosswise bars 36 to nevertheless provide a flat supporting plane to the cargo mounted thereon.

Fifth, the respective angled ends 340, 360 of the lengthwise bars 34 and the crosswise bars 36 can be fitted into the recessed portion 420 of the elongated slot 42 in each supporting leg 4, thereby securing each supporting leg 4 tightly in position so that the supporting leg 4 would be impeded from rotating about the part of the rectangular bar 32 where the supporting leg 4 is mounted.

Sixth, the lengthwise bars 34 and crosswise bars 36 forming the cargo holding board of the invention can be made of steel, and the supporting legs 4 can be made of plastics. Therefore, the overall cargo holding board is easy to recycle and requires no fumigation at the entry port.

Overall speaking, the cargo holding board of the invention is more advantageous to manufacture and utilize than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A cargo holding board comprising
   a grid-like frame for supporting a cargo box thereon;
   a plurality of supporting legs for supporting the grid-like frame, each supporting leg being fittable to a segment of the grid-like frame and having an upper body and a lower body detachably attached to the upper body,
   an elongated slot formed on a top of the upper body of the supporting leg and
   a plurality of crosswise slots and lengthwise slots formed on a bottom of the lower body of the supporting leg; and
   a strap securing mechanism for securing a cargo-retaining strap to the supporting leg.

2. A cargo holding board comprising
   a grid-like frame for supporting a cargo box thereon;
   a plurality of supporting legs for supporting the grid-like frame, each supporting leg being fittable to a segment of the grid-like frame and having an upper body and a lower body detachably attached to the upper body,
   at least one engaging slot being formed on a bottom of the upper body of the supporting leg so as to allow at least one engaging protrusion formed on a top of the lower body of the supporting leg to fit therein, thereby connecting the upper body with the lower body; and
   a strap securing mechanism for securing a cargo-retaining strap to the supporting leg.

* * * * *